US011545163B2

(12) United States Patent
Beack et al.

(10) Patent No.: US 11,545,163 B2
(45) Date of Patent: Jan. 3, 2023

(54) METHOD AND DEVICE FOR DETERMINING LOSS FUNCTION FOR AUDIO SIGNAL

(71) Applicant: Electronics and Telecommunications Research Institute, Daejeon (KR)

(72) Inventors: Seung Kwon Beack, Daejeon (KR); Woo-taek Lim, Daejeon (KR); Tae Jin Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 312 days.

(21) Appl. No.: 16/729,112

(22) Filed: Dec. 27, 2019

(65) Prior Publication Data

US 2020/0211576 A1 Jul. 2, 2020

(30) Foreign Application Priority Data

Dec. 28, 2018 (KR) ........................ 10-2018-0172613

(51) Int. Cl.
*G10L 19/032* (2013.01)
*G10L 25/30* (2013.01)

(52) U.S. Cl.
CPC ............ *G10L 19/032* (2013.01); *G10L 25/30* (2013.01)

(58) Field of Classification Search
CPC ....... G10L 19/00; G10L 19/032; G10L 25/30; G11B 2020/00; G06N 3/0481; G06N 3/063; G06N 3/08
See application file for complete search history.

(56) References Cited

U.S. PATENT DOCUMENTS

| | | | | |
|---|---|---|---|---|
| 10,068,557 | B1 | 9/2018 | Engel et al. | |
| 10,728,553 | B2 * | 7/2020 | Xu | H04N 19/124 |
| 2006/0251330 | A1 * | 11/2006 | Toth | H04N 19/52 375/E7.113 |
| 2009/0171671 | A1 | 7/2009 | Seo et al. | |
| 2016/0078863 | A1 | 3/2016 | Chung et al. | |
| 2017/0148431 | A1 | 5/2017 | Catanzaro et al. | |
| 2018/0063538 | A1 * | 3/2018 | Bernal | G06V 10/25 |
| 2018/0184123 | A1 * | 6/2018 | Terada | H04N 19/11 |
| 2019/0155709 | A1 * | 5/2019 | de Oliveira | G06F 11/3024 |

(Continued)

OTHER PUBLICATIONS

Mentzer, Fabian, Eirikur Agustsson, Michael Tschannen, Radu Timofte, and Luc Van Gool. "Conditional probability models for deep image compression." In Proceedings of the IEEE Conference on Computer Vision and Pattern Recognition, pp. 4394-4402. 2018. (Year: 2018).*

(Continued)

*Primary Examiner* — Angela A Armstrong
(74) *Attorney, Agent, or Firm* — William Park & Associates Ltd.

(57) ABSTRACT

A loss function of a signal including an audio signal is determined. A loss function determining system for an audio signal is provided. A loss function is determined by: determining a reference quantization index by quantizing an original input signal; inputting the original input signal to a neural network classifier and applying an activation function to an output layer of the neural network classifier; and determining a total loss function for the neural network classifier using an output of the activation function and the reference quantization index.

5 Claims, 6 Drawing Sheets

(56) References Cited

U.S. PATENT DOCUMENTS

| | | | | |
|---|---|---|---|---|
| 2019/0258928 | A1* | 8/2019 | Garcia | G06N 3/0481 |
| 2020/0186809 | A1* | 6/2020 | Mukherjee | G06T 9/002 |
| 2021/0366502 | A1* | 11/2021 | Kinoshita | G10L 21/0308 |

OTHER PUBLICATIONS

Z. Feng, Z. Sun and L. Jin, "Learning deep neural network using max-margin minimum classification error," 2016 IEEE International Conference on Acoustics, Speech and Signal Processing (ICASSP), 2016, pp. 2677-2681, doi: 10.1109/ICASSP.2016.7472163. (Year: 2016).*

A. Constantin, J. Ding and Y. Lee, "Accurate Road Detection from Satellite Images Using Modified U-net," 2018 IEEE Asia Pacific Conference on Circuits and Systems (APCCAS), 2018, pp. 423-426, doi: 10.1109/APCCAS.2018.8605652. (Year: 2018).*

Z. Huang, C. Weng, K. Li, Y.-C. Cheng and C.-H. Lee, "Deep learning vector quantization for acoustic information retrieval," 2014 IEEE International Conference on Acoustics, Speech and Signal Processing (ICASSP), 2014, pp. 1350-1354, doi: 10.1109/ICASSP.2014.6853817. (Year: 2014).*

Teck Yian Lim et al., Time-Frequency Networks for Audio Super-Resolution, pp. 646-650, IEEE, ICASSP 2018.

* cited by examiner

METHOD AND DEVICE FOR DETERMINING LOSS FUNCTION FOR AUDIO SIGNAL

CROSS-REFERENCE TO RELATED APPLICATION(S)

This application claims the benefit of Korean Patent Application No. 10-2018-0172613, filed on Dec. 28, 2018, in the Korean Intellectual Property Office, the disclosure of which is incorporated herein by reference.

BACKGROUND

1. Field of the Invention

Example embodiments relate to a method and system for determining a loss function for an audio signal, and more particularly, provide a more efficient quantizer by providing a loss function considering a quantizer to generate an audio signal when a neural network is applied in designing a quantizer required to generate an audio signal.

2. Description of the Related Art

Advanced Audio Coding (AAC) is used for a compression technique for an audio signal as a core technology, and may apply a psychoacoustic model to audio frequency coefficients of the entire frequency band. In addition, the AAC technology has achieved more than 30% compression performance compared to conventional MP3.

The AAC that is an audio signal compression technique has achieved improvement in compression performance by using the psychoacoustic model, but the quantization strategy based on the one-dimensional psychoacoustic model is limited in improving performance.

Therefore, there is a need for a new signal processing scheme that improves the performance of coding of audio signals and is applicable to various service environments.

SUMMARY

An aspect provides a method and a device that may perform quantization more effectively by determining a loss function for quantization required to generate an audio signal.

Another aspect also provides a method and a device that may perform quantization more efficiently by providing a loss function for quantization when neural network classification is applied to an audio signal.

According to an aspect, there is provided a method of determining a loss function including determining a reference quantization index by quantizing an original input signal, inputting the original input signal to a neural network classifier and applying an activation function to an output layer of the neural network classifier, and determining a total loss function for the neural network classifier using an output of the activation function and the reference quantization index.

A softmax that is the activation function may be set in the output layer of the neural network classifier.

The total loss function may be a loss function for cross-entropy.

According to another aspect, there is provided a method of determining a loss function including determining a reference quantization index by quantizing an original input signal, inputting the original input signal to a neural network classifier and applying an activation function to an output layer of the neural network classifier, determining a predictive quantization index from a maximum value for an output of the activation function, and determining a total loss function for the neural network classifier using the reference quantization index and the predictive quantization index.

A softmax which may be the activation function is set in the output layer of the neural network classifier.

The total loss function may be determined by a combination of a loss function for cross-entropy and a loss function of an index.

The neural network classifier may set a quantization level when the reference quantization index is determined by quantizing the input signal as a class and trains a neural network.

According to another aspect, there is provided a method of determining a loss function including determining a reference quantization index by quantizing an original input signal, inputting the original input signal to a neural network classifier and applying an activation function to an output layer of the neural network classifier, determining a predictive quantization index from a maximum value for an output of the activation function, determining a reconstructed input signal by performing inverse quantization on the predictive quantization index, and determining a total loss function for the neural network classifier using the original input signal and the reconstructed input signal.

A softmax that is the activation function may be set in the output layer of the neural network classifier.

The total loss function may be determined by a combination of a loss function for cross-entropy and a loss function of reconstruction of the input signal.

According to another aspect, there is provided a loss function determining device including a processor that determines a reference quantization index by quantizing an original input signal, inputs the original input signal to a neural network classifier and applies an activation function to an output layer of the neural network classifier, and determines a total loss function for the neural network classifier using an output of the activation function and the reference quantization index.

The total loss function may be determined by a combination of a loss function for cross-entropy and a loss function of an index.

The processor may determine a predictive quantization index from a maximum value for an output of the activation function and determine a total loss function for the neural network classifier using the reference quantization index and the predictive quantization index.

The total loss function may be determined by a combination of a loss function for cross-entropy and a loss function of an index.

The processor may determine a reconstructed input signal by performing inverse quantization on a predictive quantization index and determining a total loss function for the neural network classifier using the original input signal and the reconstructed input signal.

The total loss function may be determined by a combination of a loss function for cross-entropy and a loss function of reconstruction of the input signal.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Hereinafter, example embodiments will be described in detail with reference to the exemplary drawings.

The present disclosure proposes a loss function that may be defined when using neural network technique as a technique for reconstructing an audio signal. The methods shown through one example embodiment may be performed through a loss function determining device including hardware such as a processor and a memory.

Figure 1:
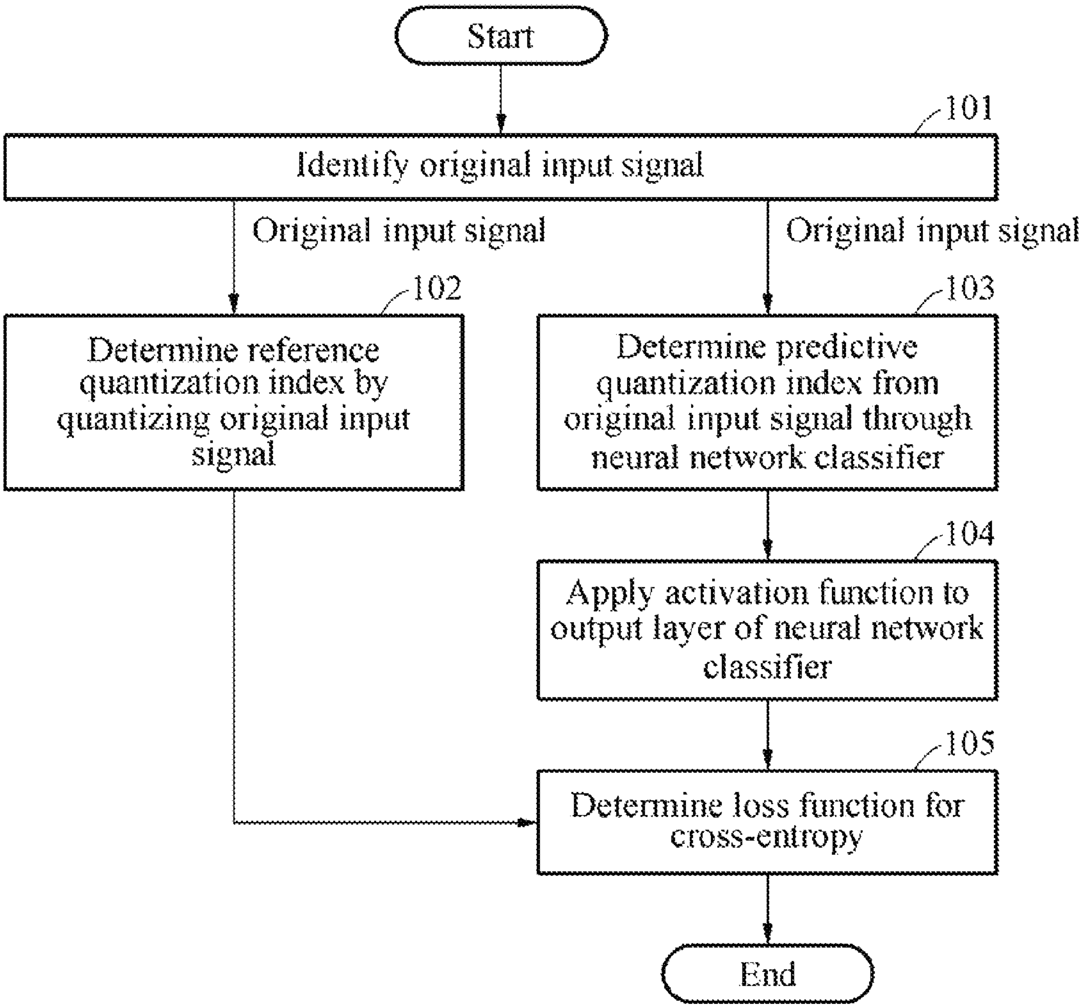
FIG. 1 is a diagram illustrating a method of determining a loss function according to an example embodiment.

FIG. 1 is a diagram illustrating a method of determining a loss function according to an example embodiment.

In operation 101, a loss function determining device may identify an original input signal. Here, the original input signal may be an audio signal.

In operation 102, the loss function determining device may quantize the original input signal and determine a reference quantization index.

In operation 103, the loss function determining device may determine a predictive quantization index from the input signal through a neural network classifier. That is, the neural network classifier may perform a quantization operation.

In operation 104, the loss function determining device may set an activation function in an output layer of the neural network classifier. In this case, the activation function may be a softmax.

In operation 105, the loss function determining device may determine a total loss function of the neural network classifier using the reference quantization index and a result of output of the softmax. Here, the total loss function may include a loss function for cross-entropy.

The process of FIG. 1 will be described in more detail with reference to FIGS. 2 to 5.

A neural network may be divided into an input layer, a hidden layer, and an output layer. The output layer of the neural network may be divided into two layers:

i) Classification layer: When information to be obtained through the neural network is a result of classification of an input signal applied to the neural network, the classification layer may be located at an output part of the neural network. In this case, the softmax may be applied to the classification layer; and ii) Regression layer: When information to be obtained through the neural network is an actual result of the input signal, the regression layer may be located at the output of the neural network. In this case, the difference between an original value of the input signal and a predicted value of the input signal, which is derived through the neural network, may be used as a loss function. This difference may be determined by various distance measurement methods.

The present disclosure provides a loss function for neural network learning when the classification layer is used to predict the input signal. In the present disclosure, a process of determining a loss function for neural network learning is embodied in FIGS. 2, 4 and 5.

A function for converting the total sum of the input signal to an output signal is defined as an activation function. The softmax may be applied to the classification layer as an activation function.

The softmax may be determined according to the following Equation 1.

$$y_k = \frac{\exp(a_k)}{\sum_{i=1}^{n} \exp(a_i)} \quad \text{[Equation 1]}$$

In Equation 1, exp(x) is an exponential function. ("e" is a natural constant), and "n" is the number of neurons in the output layer and $y_k$ is the k-th output. The numerator of the softmax is the exponential function of the input signal $a_k$, and the denominator is the sum of the exponential functions of all the input signals. The k-th output may mean a result obtained by dividing the exponential function of a k-th input by the sum of the exponential functions for all inputs.

The softmax represents the probability distribution of an event for "n" other events. The softmax may calculate the probability of each target class for all target classes, which has a value between 0 and 1. The probabilities of all target classes add up to one. The output of the softmax is affected by all inputs.

A cross-entropy error is used as the loss function of the softmax. The formula of the cross-entropy error is shown in Equation 2 below.

$$E = -\sum_{k} t_k \log y_k \quad \text{[Equation 2]}$$

In Equation 2, $y_k$ is the output of the neural network and $t_k$ is the correct answer label. In this case, $t_k$ means one-hot encoding in which only the element of the index corresponding to the correct answer is one and all the remaining elements are zero. The cross-entropy error that is a loss function is zero when the output of the neural network is one.

The loss function may refer to an indicator indicating the current state when training a neural network. The indicator used in the training of the neural network is referred to as a loss function. The loss function is an indicator representing 'bad' performance of the neural network, which indicates a degree to which processing the training data by the current neural network is difficult.

Figure 2:
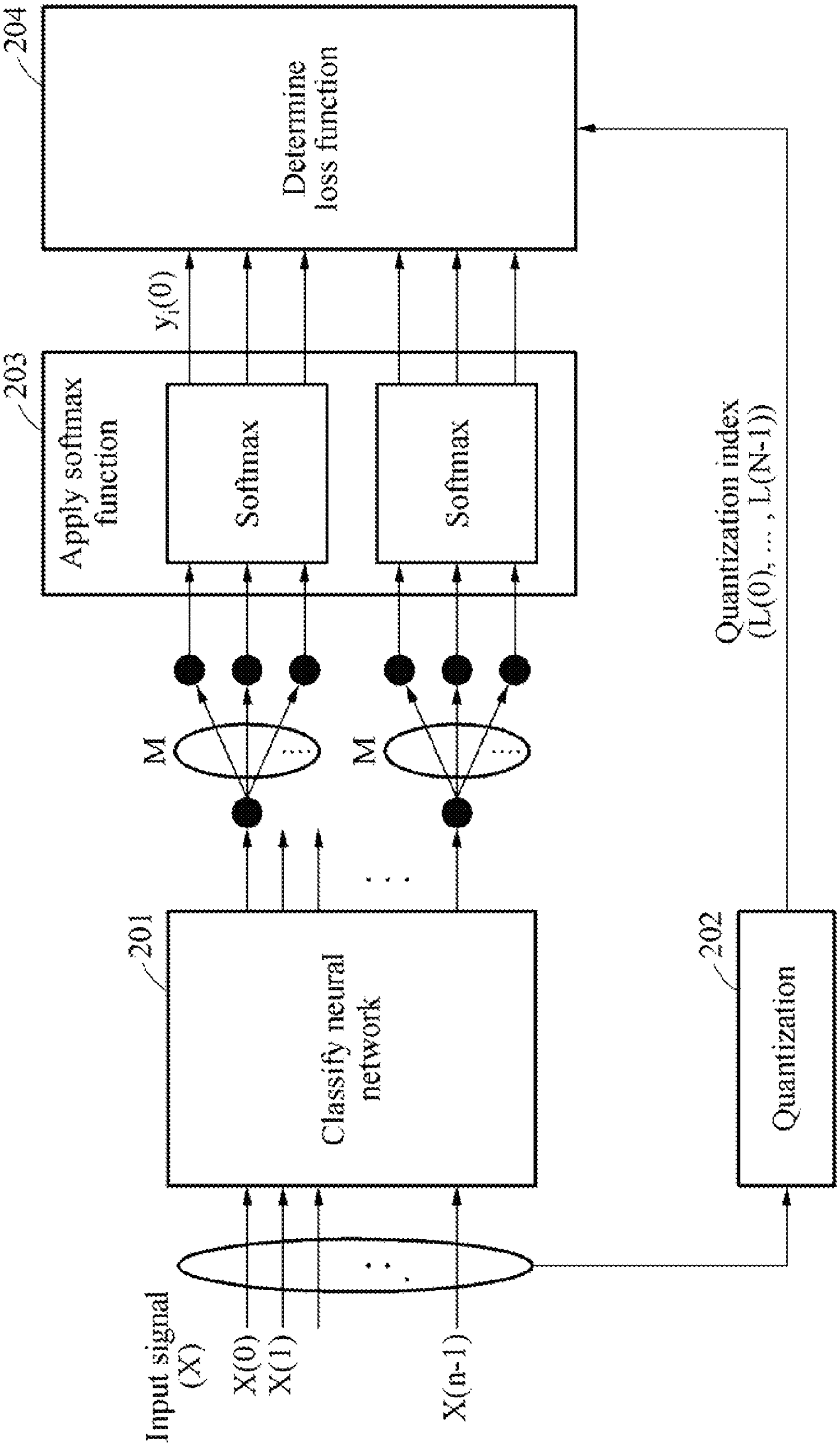
FIG. 2 is a diagram illustrating an example of a process of determining a loss function according to an example embodiment.

FIG. 2 is a diagram illustrating an example of a process of determining a loss function according to an example embodiment.

In operation 201 of FIG. 2, an input signal "x" may be input to a neural network classifier. The neural network classifier may determine a quantization index predicted by quantizing the input signal "x". In operation 202, the input signal "x" may be converted into a quantization index through quantization. The input signal "x" may be converted into the quantization index through linear or non-linear quantization. In this case, when there are M quantization levels, the quantization index for the input signal "x" may be determined as in Equation 3 below.

$$L(n) = \operatorname{argmax} Q(n) \qquad \text{[Equation 3]}$$

$$Q(n) = \underbrace{[0, \ldots, 1, \ldots 0]}_{M}$$

The quantization index may be predicted from the input signal "x" through a neural network classifier. Predicting the quantization index through the neural network classifier may mean classifying the results of the neural network classifier into specific groups. The quantization index predicted in operation 201 may match the quantization index derived through quantization in operation 202 and may be used to calculate the loss of neural network classification.

The results of the neural network classifier in operation 201 may be applied to the softmax, that is an activation function in operation 203. In operation 204, the loss function may be determined using the output result of the softmax and the quantization index derived in operation 202.

The loss function may be determined according to Equation 4 below.

$$\text{cross\_entropy\_sample\_loss}(n)=\Sigma_{i=0}^{M-1} q_i(n)\log(y_i(n)) \qquad \text{[Equation 4]}$$

In Equation 4, $q_i(n)$ means an element of $Q(n)=[q_0(n), q_1(n), \ldots, q_i(n), \ldots, q_{M-1}(n)]^T$, with only one element $q_i(n)$ being 1 and all the other elements being 0. The label information may represent a result of one-hot coding. That is, $q_i(n)$ represents 0 or 1, but $y_i(n)$ is between 0 and 1 as the output of the softmax.

The loss function for cross-entropy, which is the cross-entropy error for all inputs, may be determined according to Equation 5.

$$\text{cross\_entopy\_loss}=\Sigma_{n=0}^{N-1}\text{cross\_entropy\_sample\_loss}(n) \qquad \text{[Equation 5]}$$

Figure 3:
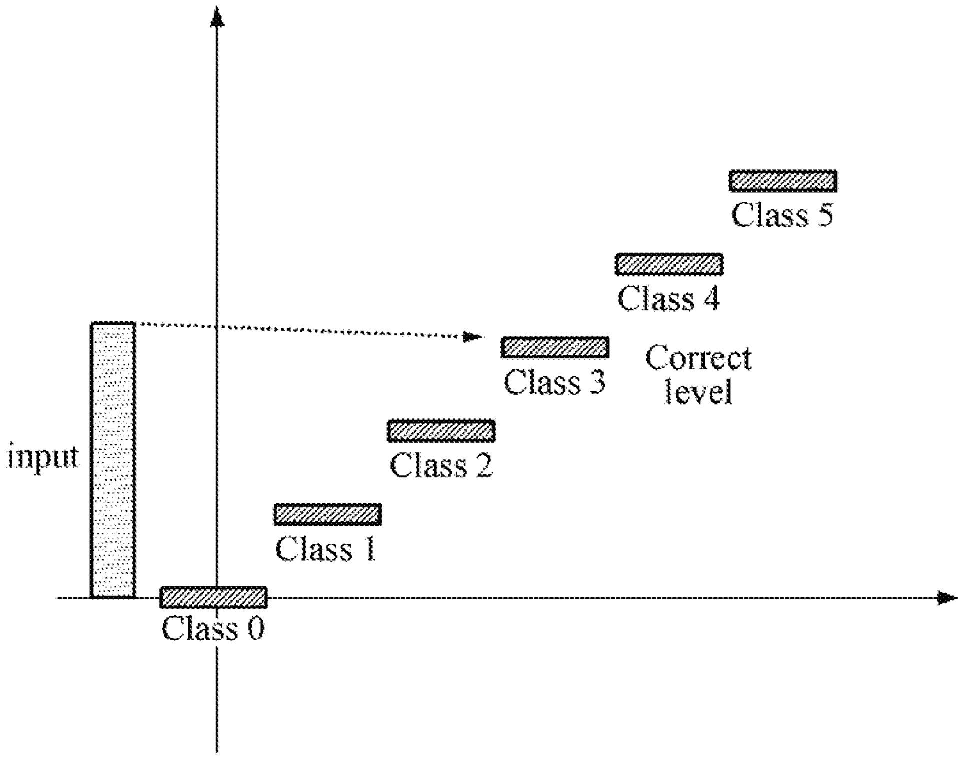
FIG. 3 is a diagram illustrating a process of setting a quantization level as a class according to an example embodiment.

FIG. 3 is a diagram illustrating a process of setting a quantization level as a class according to an example embodiment.

FIG. 2 shows a result of using a classification-based neural network as a method of predicting the input signal "x". FIG. 2 illustrates a process of quantizing an input signal, setting a quantization level to a class, and predicting the same.

In general, however, a class determined through prediction may be determined as an independent class having no correlation with other classes. For example, when 10 numerical images are input to the neural network classifier, the neural network classifier should determine the number 3 as class 3, but may determine the number 3 as 1 (class 1) or 10 (class 10).

However, when the classes related to the quantization level have correlation with each other, such correlation may need to be applied to the loss function. FIG. 3 means a result of expressing a quantization level as a class. When quantization is performed on a certain input signal, the input signal corresponds to class 3 that is the third quantization level. However, when predicting or restoring the input signal, an error that the input signal is determined as being class 0 or class 4 not class 3 may also occur. However, even when the input signal is not classified as class 3, the input signal being classified at least as class 2 or class 4 adjacent to class 3 may cause less distortion when the input signal is reconstructed.

When the neural network is trained by setting the quantization level as a class to reconstruct an original input signal, even when an error exists in a class determined through the neural network, less distortion may be caused as the class with the error is closer to the original class. That is, the closer the distance between the quantization index derived through actual quantization and the quantization index predicted through the neural network, the less distortion may occur.

Figure 4:
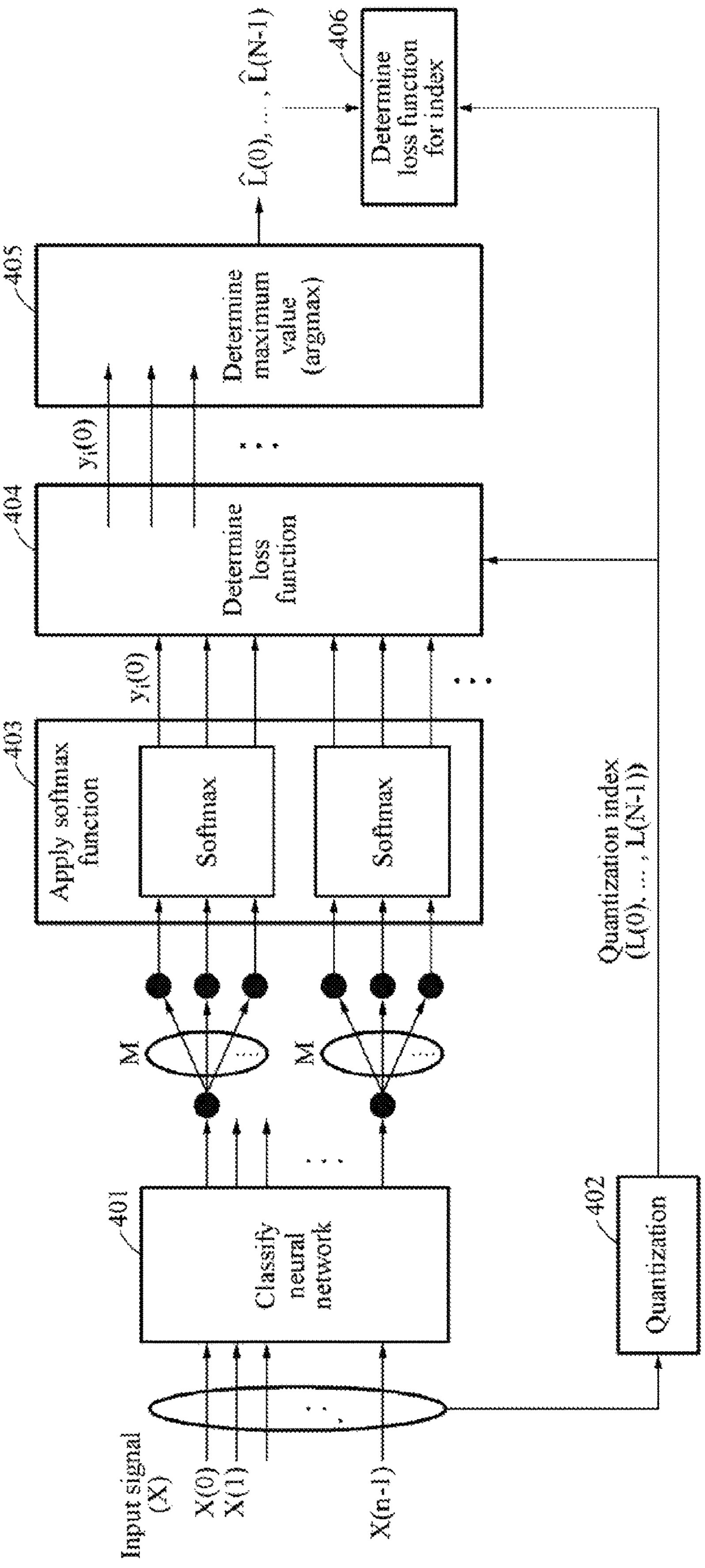
FIG. 4 is a diagram illustrating another example of a process of determining a loss function according to an example embodiment.

FIG. 4 is a diagram illustrating another example of a process of determining a loss function according to an example embodiment.

Referring to FIG. 4, the process up to operation 404 is the same as the process up to operation 204 of FIG. 2. FIG. 4 further illustrates operation 405 of determining a maximum value and operation 406 of determining a loss function for an index in addition to FIG. 2.

In operation 403, the softmax that is an activation function may be applied to an output layer of the neural network classifier 401. Thereafter, in operation 404, the loss function determining device may determine the loss function using a result of the output of the softmax and the reference quantization index derived by performing quantization on the input signal in operation 402. In operation 405, the loss function determining device may determine a value at which the loss function is maximized as a prediction quantization index $\hat{L}(n)$.

Then, the loss function for the index may be determined using the reference quantization index derived through the quantization of operation 402 and the predictive quantization index derived through the process of operation 405. The loss function for the index may be determined through Equation 6.

$$\text{Class\_Index\_Loss}=\Sigma_{n=0}^{N-1}D(L(n),\hat{L}(n)) \qquad \text{[Equation 6]}$$

Figure 5:
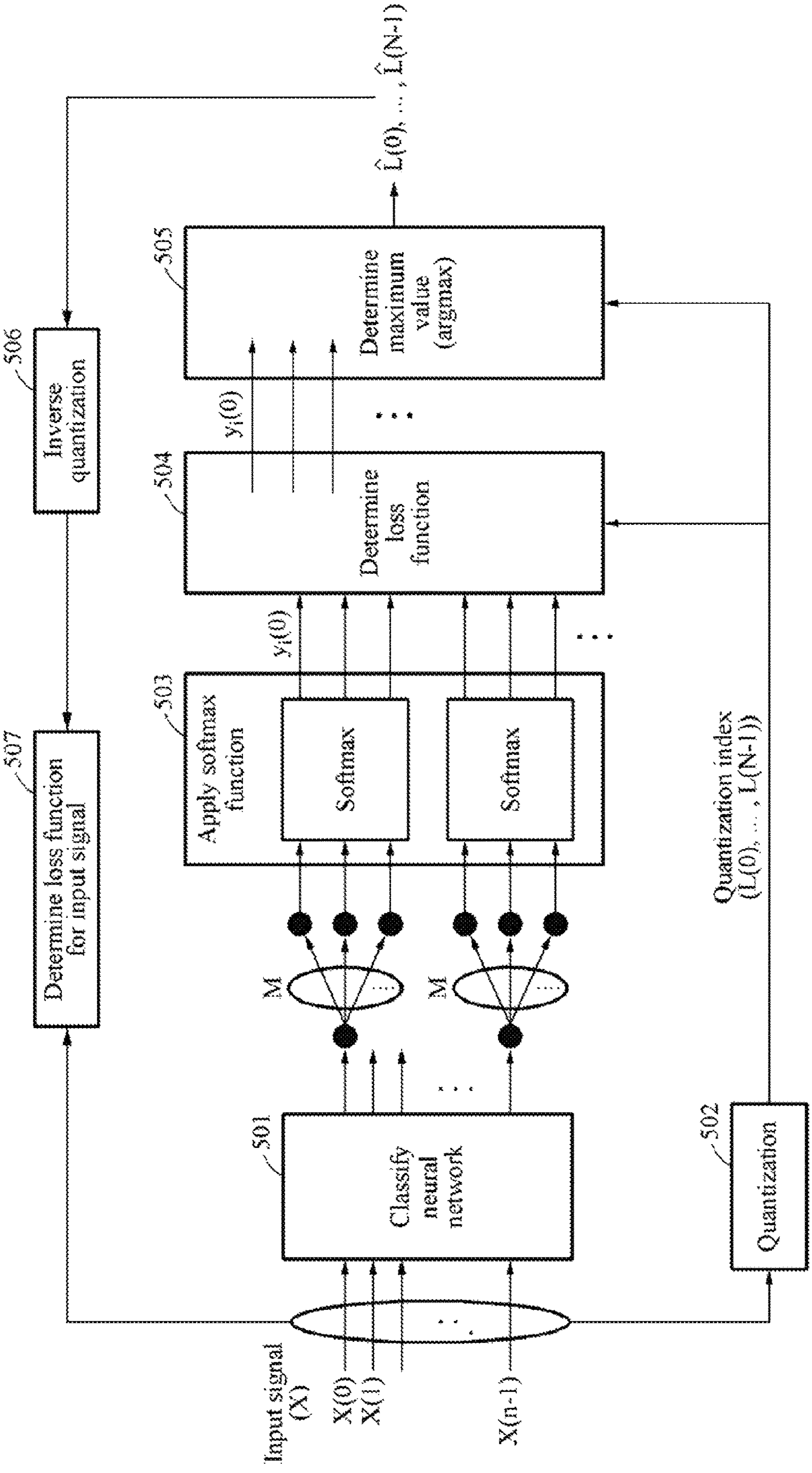
FIG. 5 is a diagram illustrating another example of a process of determining a loss function according to an example embodiment.

FIG. 5 is a diagram illustrating another example of a process of determining a loss function according to an example embodiment.

In FIG. 5, an additional synthesis process is included compared to FIG. 4. The operation 502 corresponds to operation 402, the operation 503 corresponds to operation 403, the operation 504 corresponds to operation 404 and the operation 505 corresponds to operation 405. The loss function for the input signal may be determined using the reconstructed input signal derived by performing inverse quantization on the original input signal and the predictive quantization index again in operation 506.

In operation 506, the reconstructed input signal derived from the predictive quantization index $\hat{L}(n)$ by performing inverse quantization is defined as $\hat{x}(n)$. Then, reconstruction loss, which is a loss function for reconstructing the input signal, may be determined through Equation 7.

$$\text{Reconstruction\_Loss}=\Sigma_{n=0}^{N-1}D(x(n),\hat{x}(n)) \qquad \text{[Equation 7]}$$

D(•) in Equations 6 and 7 is an operator for measuring distortion using a distance measuring method, and various distance measuring methods such as L1 and L2 may be used.

Then, in operation 504, the total loss function for the neural network classifier 501 that predicts the quantization index may be determined according to Equations 8 and 9 below. Here, Equation 8 is a total loss function derived by combining the loss function for the cross-entropy and the loss function for the quantization index. Equation 9 is a total loss function derived by combining a loss function for cross-entropy and a loss function for reconstruction of an input signal.

$$\text{Total\_Loss}=\text{cross\_entropy\_loss}+\lambda_{ci}\cdot\text{Class\_index\_loss} \qquad \text{[Equation 8]}$$

$$\text{Total\_Loss}=\text{cross\_entropy\_loss}+\lambda_{recon}\cdot\text{Reconstruction\_Loss} \quad \text{[Equation 9]}$$

$\lambda_{ci}$ and $\lambda_{recon}$ in Equations 8 and 9 may be set based on the parameters of the neural network classifier, such as the learning speed of the neural network classifier. FIGS. 2, 4, and 5 illustrate example embodiments independent of each other, but in combination of these, in operation 507, the total loss function of the neural network for classification may be determined by a combination of a loss function for cross-entropy, a loss function for quantization indexes, and restoration of the input signal.

In conclusion, according to the present disclosure, when reconstructing an input signal through the neural network classifier 501, the loss of the index and the loss of the reconstruction of the input signal may be considered together to increase the prediction accuracy while having a low distortion rate.

Figure 6:
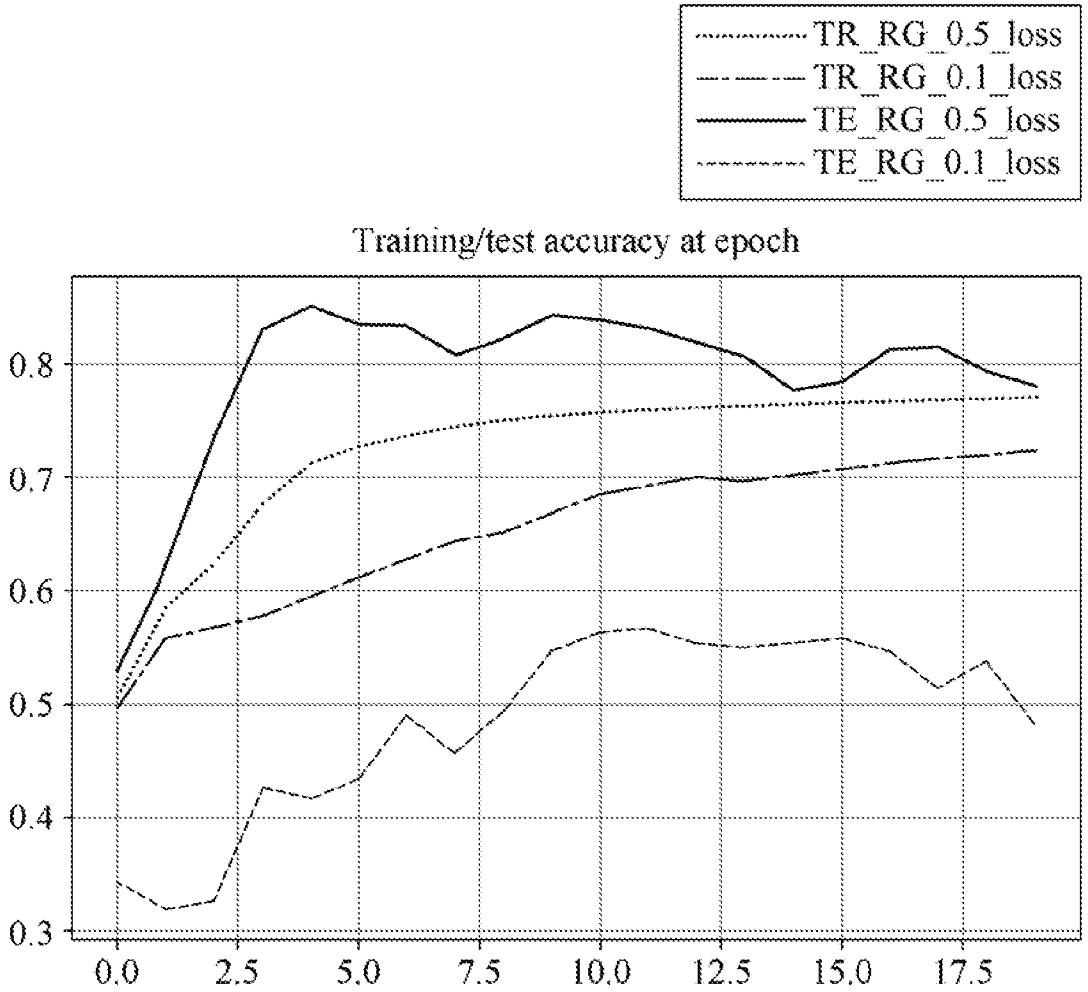
FIG. 6 is a diagram showing the performance of neural network classification according to an example embodiment.

FIG. 6 is a diagram showing the performance of neural network classification according to an example embodiment.

Referring to FIG. 6, the accuracy of the neural network classifier increases as the ratio of Class_index_loss increases in the neural network classifier.

In one example embodiment, the following neural network may be constructed. The method according to the example embodiments may be implemented as a program that may be executed in a computer, and may be implemented in various recording media, such as a magnetic storage medium, an optical read medium, and a digital storage medium.

According to example embodiments, it is possible to more effectively perform quantization performed by determining a loss function based on quantization when a neural network is applied for quantization required in processing of an audio signal.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

Implementations of various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, may be written in any form of programming language, including compiled or interpreted languages, and may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, for example, magnetic media such as hard disks, floppy disks and magnetic tape, compact disk read only memory (CD-ROM), optical media such as digital video disks (DVDs), magneto-optical media such as floppy disks, read only memory (ROM), random access memory (RAM), flash memory, erasable programmable ROM (EPROM), electrically erasable programmable ROM (EEPROM), and the like. The processor and the memory may be supplemented by, or incorporated in, special purpose logic circuitry.

Further, the computer readable media may be any available medium that may be accessed by computer and includes both computer storage media and transmission media.

While this specification contains many specific implementation details, these should not be construed as limitations on the scope of any inventive concepts or of what may be claimed, but rather as descriptions of features specific to particular example embodiments of particular inventive concepts. Certain features that are described in this specification in the context of separate example embodiments also may be implemented in combination in a single example embodiment. Conversely, various features that are described in the context of a single example embodiment may also be implemented in multiple example embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the example embodiments described above should not be understood as requiring such separation in all example embodiments, and it should be understood that the described program components and systems may generally be integrated together in a single software product or packaged into multiple software products.

The example embodiments disclosed in the specification and drawings are merely presented specific examples to aid understanding and are not intended to limit the scope of the present disclosure. It is apparent to those skilled in the art that other modifications based on the technical idea of the present disclosure may be carried out in addition to the example embodiments disclosed herein.

What is claimed is:

1. A processor-implemented method of determining a loss function of a signal comprising an audio signal, the method comprising:

determining a reference quantization index by quantizing the signal comprising the audio signal;

inputting the signal comprising the audio signal to a neural network classifier and applying an activation function to an output layer of the neural network classifier; and determining, by a loss function determining device, a total loss function for the neural network classifier using an output of the activation function and the reference quantization index according to below equation, <Equation>

$$Total_{Loss} = cross_{entropy_{loss}} + \lambda_{ci} \cdot Class_{index_{loss}} \qquad \text{< Equation >}$$

$$cross_{entopy_{loss}} = \sum_{n=0}^{N-1} cross_{entropy_{sample_{loss(n)}}}$$

$$\text{cross\_entropy\_sample\_loss}(n) = -\sum_{i=0}^{M-1} q_i(n)\log(y_i(n))$$

$$Class_{Index_{Loss}} = \sum_{n=0}^{N-1} D\big(L(n), \hat{L}(n)\big),$$

$$L(n) = \text{argmax}Q(n)$$

$$Q(n) = [\underbrace{0, \ldots, 1, \ldots 0}_{M}],\ Q(n) = [q_0(n), q_1(n), \ldots, q_i(n), \ldots, q_{M-1}(n)]^T$$

wherein the $q_i(n)$ represents 0 or 1 and $y_i(n)$ is an output of a softmax, wherein the $\lambda_{ci}$ is set based on parameters of the neural network classifier, and wherein the $\hat{L}(n)$ is the prediction quantization index, wherein the neural network classifier sets a quantization level when the reference quantization index is determined by quantizing the input signal as a class, and wherein the loss function determining device sets the activation function in an output layer of the neural network classifier.

2. The method of claim 1, wherein the softmax that is the activation function is set in the output layer of the neural network classifier.

3. A processor-implemented method of determining a loss function of a signal comprising an audio signal, the method comprising:

determining a reference quantization index by quantizing the signal comprising the audio signal;

inputting the signal comprising the audio signal to a neural network classifier and applying an activation function to an output layer of the neural network classifier;

determining a predictive quantization index from a maximum value for an output of the activation function; and determining, by a loss function determining device, a total loss function for the neural network classifier using the reference quantization index and the predictive quantization index, $$Total_{Loss} = cross_{entropy_{loss}} + \lambda_{recon} \cdot Reconstruction_{Loss} \qquad \text{< Equation >}$$

$$cross_{entropy_{loss}} = \sum_{n=0}^{N-1} cross_{entropy_{sample_{loss(n)}}}$$

$$\text{cross\_entropy\_sample\_loss}(n) = -\sum_{i=0}^{M-1} q_i(n)\log(y_i(n))$$

$$Class_{Index_{Loss}} = \sum_{n=0}^{N-1} D\big(L(n), \hat{L}(n)\big),$$

$$L(n) = \text{argmax}Q(n)$$

$$Q(n) = [\underbrace{0, \ldots, 1, \ldots 0}_{M}]Q(n) = [q_0(n), q_1(n), \ldots, q_i(n), \ldots, q_{M-1}(n)]^T$$

wherein the $q_i(n)$ represents 0 or 1 and $y_i(n)$ is an output of a softmax, wherein the $\lambda_{ci}$ is set based on parameters of the neural network classifier, and wherein the $\hat{L}(n)$ is the prediction quantization index, wherein the neural network classifier sets a quantization level when the reference quantization index is determined by quantizing the input signal as a class, and wherein the loss function determining device sets the activation function in an output layer of the neural network classifier.

4. The method of claim 3, wherein the softmax that is the activation function is set in the output layer of the neural network classifier.

5. The method of claim 3, wherein the total loss function is determined by a combination of a loss function for cross-entropy and a loss function of an index.

* * * * *